(12) United States Patent
Kress et al.

(10) Patent No.: US 6,650,438 B1
(45) Date of Patent: Nov. 18, 2003

(54) CONSTRUCTION OF A COLOR TRANSFORM TO REDUCE EFFECTS OF SCANNER METAMERISM

(75) Inventors: William C. Kress, Mission Viejo, CA (US); James Z. Chang, Vancouver, WA (US)

(73) Assignee: Sharp Laboratories of America, Inc,, Camas, WA (US)

( * ) Notice: Subject to any disclaimer, the term of this patent is extended or adjusted under 35 U.S.C. 154(b) by 0 days.

(21) Appl. No.: 09/452,815

(22) Filed: Dec. 1, 1999

(51) Int. Cl.[7] ............................................... G06K 15/00
(52) U.S. Cl. ......................................... 358/1.9; 358/2.1
(58) Field of Search ........................... 358/1.6, 1.9, 2.1, 358/1.18; 258/500, 518, 530

(56) References Cited

U.S. PATENT DOCUMENTS

| | | | |
|---|---|---|---|
| 4,060,829 A | | 11/1977 | Sakamoto |
| 4,342,047 A | | 7/1982 | Niemczyk et al. |
| 4,346,402 A | | 8/1982 | Pugsley |
| 4,929,978 A | | 5/1990 | Kanamori et al. |
| 5,149,960 A | | 9/1992 | Dunne et al. |
| 5,185,661 A | | 2/1993 | Ng |
| 5,200,817 A | | 4/1993 | Birnbaum |
| 5,237,409 A | * | 8/1993 | Yamaguchi ............... 358/133 |
| 5,285,271 A | | 2/1994 | Gennetten |
| 5,452,112 A | | 9/1995 | Wan et al. |
| 5,491,568 A | | 2/1996 | Wan |
| 5,543,940 A | | 8/1996 | Sherman |
| 5,665,963 A | | 9/1997 | Campbell |
| 5,773,814 A | | 6/1998 | Phillips et al. |
| 6,275,607 B1 | * | 8/2001 | Shimizu ..................... 382/167 |

OTHER PUBLICATIONS

R. Holub et al., *Color systems calibration for graphic arts: I. Input devics* Journal of Imaging Technology, vol. 14, No. 2, Apr. 1988.
P.C. Hung, *Colorimetric calibration for scanners and media*, SPIE vol. 1448, 1991.
R. E. Burger, *Device independent color scanning*, SPIE vol. 1909, 1993.
P. G. Engeldrum, *Color scanner colorimetric design requirements*, SPIE vol. 1909, 1993.
K. D. Gennetten et al., *Designing a scanner with color vision*, Hewlett–Packard Journal, Aug. 1993.
S. D. Lee, et al., *Linear model of surface and scanner characterization method*, SPIE vol. 2414, 1995.

* cited by examiner

Primary Examiner—Jerome Grant, II
(74) Attorney, Agent, or Firm—Robert D. Varitz, P.C.

(57) ABSTRACT

A method of transforming scanned RGB values into a colorimetric color space includes identifying multiple input media types to be scanned; assigning a weighting factor to each input media type; dividing input color space into segments; assigning a weighting factor to each input color space segment; applying regression and interpolation techniques to minimize color error; and generating a colorimetric output.

11 Claims, 3 Drawing Sheets

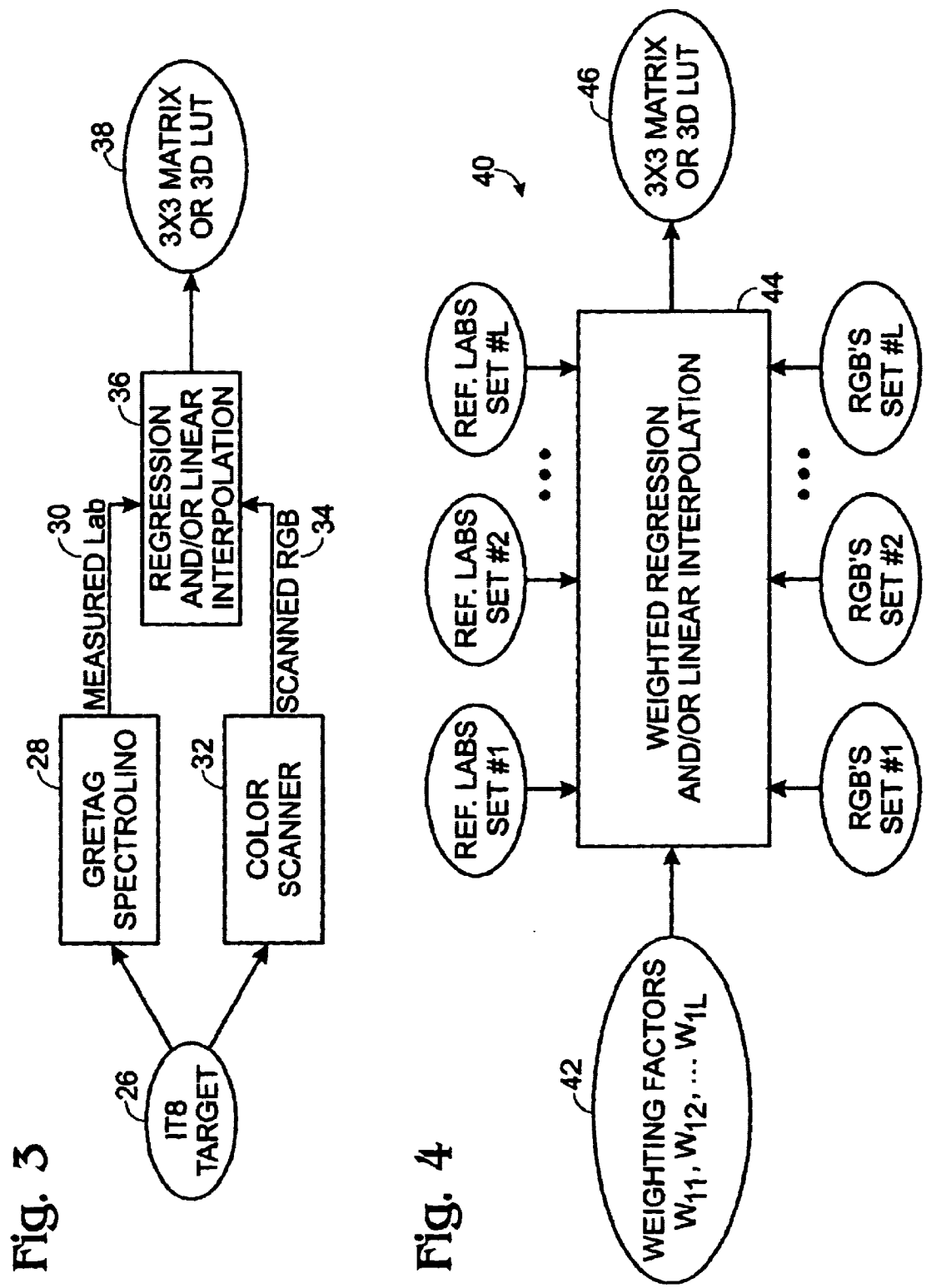

CONSTRUCTION OF A COLOR TRANSFORM TO REDUCE EFFECTS OF SCANNER METAMERISM

FIELD OF THE INVENTION

This invention relates to digital color copying systems, and specifically to a copying system wherein the raw RGB signals from the scanner is transformed into a calibrated colorimetric space so that the color signals may be further manipulated.

BACKGROUND OF THE INVENTION

One form of modem color document scanner includes an illuminant light source, three color filters (R. G, and B), and a CCD detector. The illuminant is a wide band artificial light source that is different from the viewing illuminant. The light reflected from the target is filtered by the RGB filters before reaching the CCD detector, thus producing a three-channel RGB signal. If the combined spectral responses of the illuminant, the RGB filters, and the CCD detector are a linear combination of the CIE Color Matching Functions (CMFs), a color scanner may see colors exactly as seen by the human visual system (HVS), through proper processing. However, this situation generally does not occur because of necessary compromises of light source efficiency and the cost associated with designing and manufacturing color filters. It is possible that a color scanner sees two distinct colors as the same color, while the human visual system views the colors as different, or vice versa. This is the scanner metamerism problem. It makes the color characterization of a scanner extremely media and colorant dependent. A scanner characterization that works well for one set of media and colorant combination will usually make use of the special spectral characteristics of that combination and therefore works poorly for other media and colorant combinations.

In order to obtain meaningful colorimetric values from a RGB scanner, color characterization must be performed on the scanner. The characterization procedure begins by scanning a set of color patches for a certain colorant and media combination to obtain raw scanner RGB values. The color patches are also measured by a spectrophotometer, such as a Gretag Spectrolino, to obtain their CIE XYZ or Lab values. After these two sets of data are obtained, regression and/or interpolation techniques may be used to establish a mathematical model for converting scanner RGB values to CIE relatable values, such as CIE XYZ or Lab values, or other output matrices.

The two commonly used mathematical models are based on matrices and 3D look-up-tables (LUTs). The recently published ICC Profile Format Specification, International Color Consortium, *ICC profile format specification*, Version 3.4, Aug. 15, 1997, contains scanner profile formats based on these two models. In general, these techniques produce satisfactory results for a specific colorant and media combination. However, because of scanner metamerism, a scanner transform generated for one colorant and media combination will not work well for another combination. Many scanning applications in the graphic arts acquire images from a limited number of colorant and media combinations, such as reflection photographic prints, color transparencies, or color negative films. A specific color transform is made available for each colorant and media combination, resulting in quite accurate color conversion. Scanner metamerism is not an issue in such use.

The documents to be scanned by a digital color copier, however, originate from a variety of sources and include many different colorant and media combinations. These combinations include, among others, photographic prints, graphic arts materials, ink on various ink jet papers, and laser printer outputs. It is not practical to require a typical user to identify the colorant and media to be scanned. Therefore, only one transform may be provided for color conversion across different colorant and media combinations. One commonly used approach is to average individually generated transforms to produce a combined color conversion transform. The problem with this approach is that although an individual transform works well for its intended colorant and media combination, the combined color conversion transform may result in error prone color conversion across different media.

Attempts have been made to produce colorimetric digital input devices, as described by P. G. Engeldrum, *Color scanner colorimetric design requirements*, "SPIE Vol. 1909, 1993, and R. E. Burger, *Device independent color scanning*, SPIE Vol. 1909, 1993, however, such devices have not been successful. A scanner built according to Engledrum or Burger is quite expensive, as the combined spectral responses of digital filters, light source, and CCD detector must correspond closely to CMFs. Most modern scanners are, at best, approximately colorimetric and accurate color conversions for them are still colorant and media specific.

The following patents describe methods for calibrating a RGB scanner to make it produce color values in a colorimetric space.

U.S. Pat. No. 4,060,839 to Sakamoto, for Method of color correction, granted Nov. 29, 1977, provides correction to a RGB signal in CMYK color space.

U.S. Pat. No. 4,342,047, to Niemczyk et al., for Color calibration accuracy in a color raster scanner, granted Jul. 27, 1982, describes a scanner which analyzes small area of an image containing a single color only, and moving a scan head about in that area.

U.S. Pat. No. 5,149,960 to Dunne et al., for Method of converting scanner signals into colorimetric signals, granted Sep. 22, 1992, describes sensing an input image to generate an input signal and processing the input signal in an iterative correction loop.

U.S. Pat. No. 5,200,817 to Birnbaum for Conversion of an RGB color scanner into a colorimetric scanner, granted Apr. 6, 1993, describes an RGB input which is transformed to an equivalent neutral density (END)-like RGB signal, which is then transformed to a tristimulus XYZ signal.

U.S. Pat. No. 5,452,112 to Wan et al., for Color image reproduction system field calibration method and apparatus, granted Sep. 19, 1995, uses a scanning target, reference files and an image to generate a printer calibration table.

U.S. Pat. No. 5,491,568 to Wan, for Method and apparatus for calibrating a digital color reproduction apparatus, granted Feb. 13, 1996, uses tri-linear interpolation based on a 3D LUT to implement a color transform.

U.S. Pat. No. 5,543,940 to Sherman, for Method and apparatus for converting color scanner signals into colorimetric values, granted Aug. 6, 1996, requires designation of a specific medium to construct a calibration model for a scanner.

The following patents describe scanner color calibration.

U.S. Pat. No. 4,346,402, to Pugsly, for Image-reproduction apparatus, granted Aug. 24, 1982, uses a 3D LUT or ROM to provide color-corrected signals.

U.S. Pat. No. 4,929,978 to Kanamori et al., for Color correction method for color copier utilizing correction table derived from printed color samples, granted May 29, 1990, uses sample colors that are compared to scanned values to determine proper output.

U.S. Pat. No. 5,185,661 to Ng, for Input scanner color mapping and input/output color gamut transformation, granted Feb. 9, 1993, describes scanner color calibration using a 3×3 transform matrix and a color gamut compression list.

The following references describe methods which are embedded into RGB scanners to make the scanner output signals more colorimetric:

U.S. Pat. No. 5,285,271 to Gennetten, for Digital color matrix circuit, granted Feb. 8, 1994, transforms the intensity of each encoded color.

U.S. Pat. No. 5,665,963 to Campbell, for Reflective color filter for color correction of photodetector filters, granted Sep. 9, 1997, uses a wave-length specific filter to suppress IR and longer-wave visible red light.

U.S. Pat. No. 5,773,814 to Phillips, et al., for Sensor assembly providing gray scale and color for an optical image scanner, granted Jun. 30, 1998, describes a sensor array having three sub-arrays, including one white (unfiltered) sub-array and two color sub-arrays, wherein only the white sub-array is used for grey-scale sensing and wherein all three sub-arrays are used to sense color.

The following references describe various scanner operations and features: K. D. Gennetten and M. J. Steinle, *Designing a scanner with color vision*, Hewlett-Packard Journal, August 1993; Lee et al., *Linear model of surface and scanner characterization method*, SPIE Vol. 2414, 1995; Hung, *Colorimetric calibration for scanners and media*, SPIE Vol. 1448, 1991; Holub et aL, *Color systems calibration for graphic arts*: 1. *Input devices*, Journal of Imaging Technology, Vol. 14, No. 2, April 1988; and International Color Consortium, *ICC profile format specification*, Version 3.4, Aug. 15, 1997.

SUMMARY OF THE INVENTION

A method of transforming scanned RGB values into a colorimetric color space includes identifying multiple input media types to be scanned; assigning a weighting factor to each input media type; dividing input color space into segments; assigning a weighting factor to each input color space segment; applying regression and interpolation techniques to minimize color error; and generating a colorimetric output.

An object of the invention is to provide a method for using weighting factors to obtain optimal scanner conversion transforms across different colorant and media combinations.

Another object of the invention is to manipulate an RGB input to obtain a CIE colorimetric color output.

A further object of the invention is to provide weighting factors to optimize HVS perception of an output image.

These and other objects and advantages of the invention will become more fully apparent as the description which follows in read in conjunction with the drawings.

BRIEF DESCRIPTION OF THE DRAWINGS

FIG. 3 depicts a prior art method for generating a matrix or 3D LUT for scanner color conversion.

FIG. 4 depicts a first embodiment of the invention of assigning weighting factors to different colorant and media combinations.

DETAILED DESCRIPTION OF THE PREFERRED EMBODIMENTS

A digital color copying system includes an input color scanner, an output color printer, and a color image processing pipeline between the scanner and printer to process the input image obtained from the scanner to an output image suitable for the output printer. A component of the color image processing pipeline is to convert a raw RGB signal from the scanner to a calibrated colorimetric space so that the color signals may be further manipulated.

In CIE colorimetric color spaces, a color is usually specified as XYZ or Lab values. The XYZ color space is a tristimulus color space based on the CIE 1931 standard observer. It is device independent and based on the human color matching experiments conducted by the CIE. However, this color space is not visually uniform, which means that equal changes in the XYZ space do not lead to equal perceptual differences by the HVS. CIE developed a mathematical transformation that converts the XYZ color space into the approximately perceptually uniform Lab color space to minimize the perceptual differences of the human visual system (HVS). For each color, appropriate color measuring instruments are used to measure its XYZ or Lab values. Because Lab is approximately perceptually uniform to the HVS, it is generally used as the calibrated colorimetric color space and color errors are measured in this space.

Figure 1:
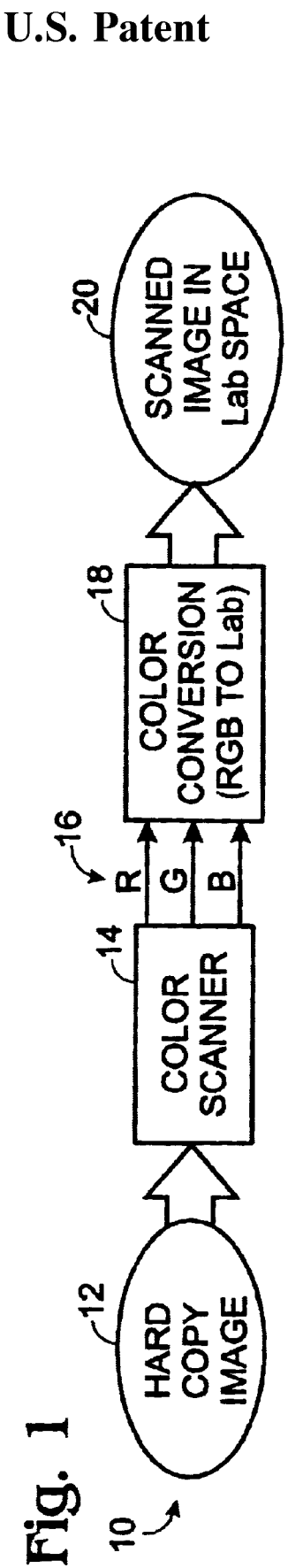
FIG. 1 depicts scanner color conversion from scanned RGB to CIE Lab.

As shown in FIG. 1, generally at 10, a hard copy image 12 is scanned by a scanner 14. Scanner 14 first converts input hard copy image 12 into an rectangular array of pixels, wherein each pixel contains R, G, and B signals 16. These RGB signals are further converted into a colorimetric color space signals 20, such as CIE Lab color space, by a color conversion block 18. If the scanner is accurately color characterized, the output CIE Lab image will be an accurate representation of the input image, represented in CIE Lab color space.

Figure 2A:
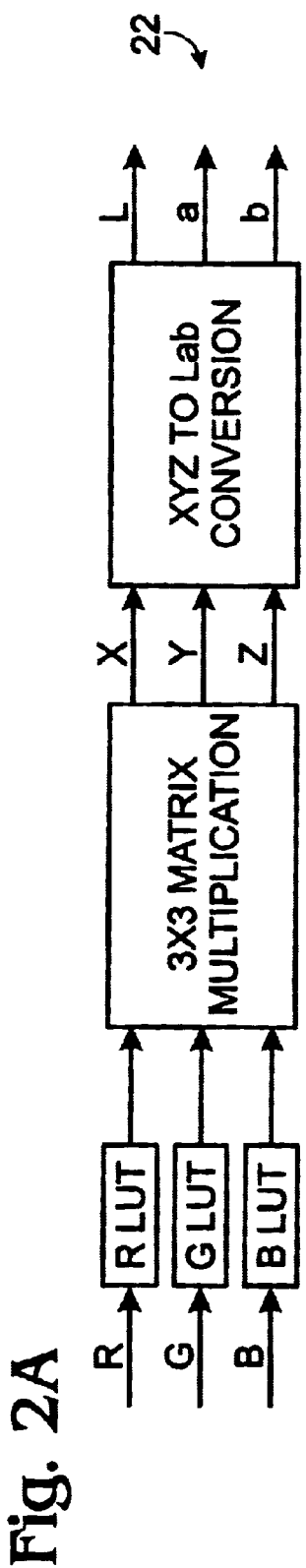
FIG. 2 depicts prior art scanner color conversion processes.
Figure 2B:
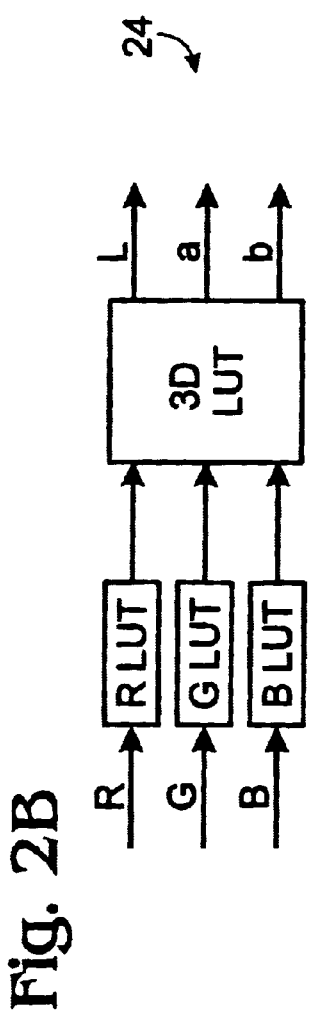

There are two techniques for implementing the color conversion process: matrix multiplication, shown in FIG. 2a, generally at 22, and with look-up-table (LUT) 3D interpolation, shown in FIG. 2b, generally at 24. These techniques are well known in the art. However, in order to obtain good color conversion results using either of these techniques, a good matrix or 3D LUT is required, depending on the method of choice.

Referring now to FIG. 3, a prior art scanner target, such as an IT-8 target 26, which contains color patches that represent the color gamut of a certain photographic process, is first measured by a spectrophotometer 28, such as a Gretag Spectrolino, to obtain the reference Lab values, ($L_0$, $a_0$, $b_0$) 30. Alternately, the reference Lab values may also be provided by the manufacturer of the IT-8 target. The target is then scanned by a scanner 32 to be calibrated and the scanned RGB values 34 of the color patches are extracted from the scanned image. The reference Lab values and the scanner RGB values are fed into a regression procedure 36 to obtain the optimal 3×3 matrix or 3D,LUT 38 to be used in the color conversion process. To obtain the 3×3 matrix as shown in FIG. 2*a*, a regression procedure is used. If 3D LUT is used for color conversion as in FIG. 2*b*, linear interpolation and regression techniques are used to obtain the optimal 3D LUT.

Lab values for the color patches obtained by the color conversion process in FIG. 1 may be represented by ($L_1$, $a_1$, $b_1$). The objective of the regression and interpolation procedure is to minimize the mean squared error (MSE) in the Lab space, $$MSE = 1/N \Sigma [(L_0 - L_1)^2 + (a_0 - a_1)^2 + (b_0 - b_1)^2], \quad (1)$$

where N is the number of color patches in the target and the summation is over these N color patches. Scanner targets for other media and colorant combination may be used to obtain 3×3 matrix or 3D LUT for color conversion that minimizes the MSE for that combination. Error metrics, such as average error, maximum error, etc., may also be minimized as alternate techniques. The regression and linear interpolation procedures may be implemented by using the MATLAB Optimization Toolbox. However, in general, the 3×3 matrix or 3D LUT obtained by the procedure above that minimizes the MSE for a certain media and colorant combination, for example, photographic prints, will produce an unacceptable large MSE for other media and colorant combinations, i.e., graphic arts inks and paper, ink jet prints on various types of paper, etc.

In a color copier environment, different colorant and media combinations, such as photographic prints, graphic arts, color laser prints, and color ink jet prints on different media, may be scanned. Different colorant and media combinations have different color gamuts. The probability that each combination is encountered in a typical office environment may be estimated. Furthermore, the human visual system (HVS) is more sensitive to certain areas of the color space, such as neutral grays and skin tones. Using this information, different weighting factors may be assigned to different areas of the color gamuts for different colorant and media combinations. Based on these weighting factors, regression and interpolation techniques may be used to build a single scanner color conversion transform that minimizes the weighted color error across different colorant and media combinations. The advantage of this method is that the overall color conversion error across different colorant and media combinations may be controlled.

In the methods disclosed herein, multiple colorant and media combinations are simultaneously considered in obtaining optimal parameters for the models. The method of the invention assigns different weighting factors to different areas of the color gamut for different colorant and media combinations. Specifically, the weighting is divided into three considerations:
1. Weights as per the importance of the colorant/media in the product usage.
2. Weights as per importance of area of color space.
3. Weights as per position of color gamut based on the gamut difference of colorant/media.

In the first embodiment of the invention, shown in FIG. 4, generally at 40, different scanner targets, also referred to herein as segments of the input color space, are created for multiple colorant and media combinations. Each target contains a large number of color patches which uniformly sample the entire color gamut of that colorant and media combination. Each target is scanned by the scanner to obtain the RGB values (RGB Sets 1 . . . L) for the color patches on the target. The targets are also measured by a spectrophotometer, such as a Gretag Spectrolino, to obtain the reference CIE Lab values (Lab Sets 1 . . . L). A weighting factor 42 is assigned to each colorant and media combination in the weighted regression and interpolation process 44 to obtain the optimal 3×3 matrix or 3D LUT 46 for scanner color conversion.

Assuming that the number of different colorant and ink media combination is L, the objective of the optimization is to minimize the weighted MSE, $$WMSE = \sum_{i=1}^{L} W_{1i}(MSE)_i, \quad (2)$$

where the weighting factors will sum up to one, $$\sum_{i=1}^{L} W_{1i} = 1. \quad (3)$$

The component MSE's, $(MSE)_i$, may still be computed by Eqn. (1).

In the preferred embodiment of the invention, six scanner targets are provided on different colorant and media combinations: (1) Kodak® photographic print, (2) graphic arts media, (3) HP® ink jet prints on photo paper, outputs from (4) Tektronix® laser printers, (5) Canon® laser printers, and (6) Xerox® laser printers. Statistically, most of the material being copied on color copiers is graphic arts material. A weighting factor of 0.6 is assigned to the graphic arts target. The second most frequently copied material is photographic prints and a weighting factor of 0.2 is assigned to the Kodak® photographic print target. Ink jet and laser printer prints are infrequently copied and are each assigned a weighting factor of 0.1. Because the HP® ink jet target is the only material in its category, its weighting factor is 0.1. The Tektronix®, Canon®, and Xerox® laser printer targets are each assigned a weighting factor of approximately 0.033. The selection of colorant and media combinations and their weighting factors may be changed depending on the target market segment where the color copiers are being sold.

Figure 5:
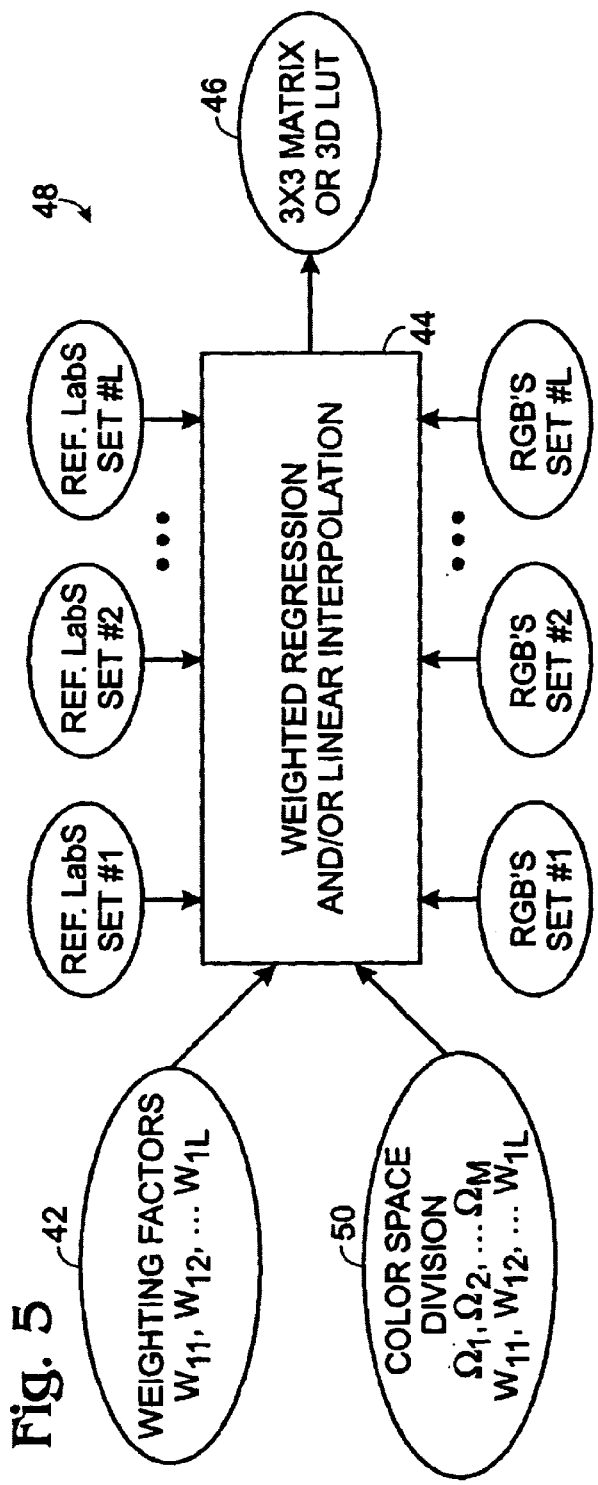
FIG. 5 depicts a second embodiment of the invention weighting factors are assigned to different regions of the CIE Lab color space.

In the second embodiment of the invention, shown generally at 48 in FIG. 5, the CIE Lab color space, $\Omega$, is divided into M non-overlapping regions, in addition to using multiple targets from different colorant and media combinations:

$$\Omega = \Omega_1 \cup \Omega_2 \ldots \cup \Omega_M, \quad (4)$$

where $$\Omega_i \cap \Omega_j = \emptyset, \text{if } i \neq j. \quad (5)$$

According to the relative importance of each region, we may assign weighting factors to the different regions of the color gamut. As shown in FIG. 5, we will use weighted regression and interpolation techniques to minimize the following weighted MSE, $$WMSE = \sum_{i=1}^{L} W_{1i}(WMSE)_i, \quad (6)$$

where $$(WMSE)_i = \sum_{j=1}^{M} W_{2j} \left( \frac{1}{N_{ij}} \sum_{\Omega_j} [(L_0 - L_1)^2 + (a_0 - a_1)^2 + (b_0 - b_1)^2] \right), \quad (7)$$

where $$\sum_{j=1}^{M} W_{2j} = 1. \quad (8)$$

The inner summation sums over $N_{ij}$ color patches of the i th colorant and media combination that fall within the j th region of the CIE Lab color space. The color regions and the color target for each colorant and media combination are designed such that one or more color patches in each target will fall within each color region, so that $N_{ij}$ will not be set to zero.

In this embodiment, the CIE Lab space is divided into three regions: near-neutral gray, skin tone, and another region including CIE Lab space not contained in the near-neutral or skin tone regions. Because human observers are very sensitive to the errors in neutral color, a weighting factor of 0.5 is assigned to this region. The second area that human observers will pay particular attention to is the skin tone region and a weighting factor of 0.3 is assigned to this region. The remaining region of the color space is assigned a weighting factor of 0.2. As with the first embodiment, the choice of color regions and the associated weighting factors depends on the intended usage of the color copier. The CIE Lab space may, in other embodiments of the invention, be divided into as few or as many regions as desired.

Figure 6:
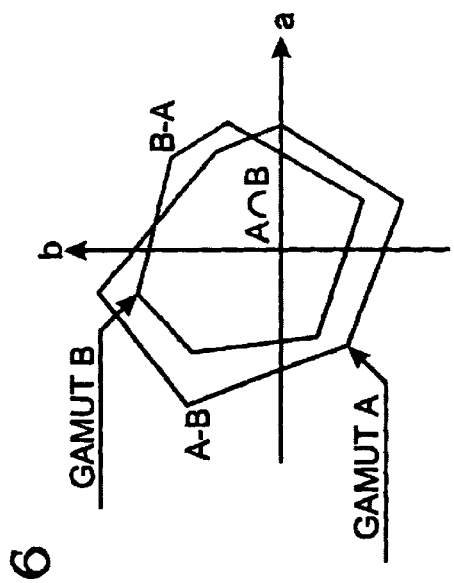
FIG. 6 depicts two different color gamut volume boundaries used in a third embodiment of the invention.

In the third embodiment of the invention, the color gamut differences of different colorant and media combinations is used. FIG. 6 shows two typical gamut volumes at a certain L level on the a-b plane. Gamut volume A represents a first set of media types including the color gamut of inkjet prints or photographic prints, while volume B represents a second set of media types including the gamut of the graphic arts colorant and media. These two gamuts divide the combined gamut into three regions: the region common to both A and B, A∩B, the region that belongs to A but not B, A-B and the one to B but not A, B-A. For gamut A, two weighting factors, $W_{A1}$ and $W_{A2}$, are assigned for the overlapping and non-overlapping regions, respectively. Similarly, weighting factors, $W_{B1}$ and $W_{B2}$, are assigned to the two regions of gamut B. The objective of the regression and interpolation is to minimize the following weighted MSE, $$WMSE = W_{A1}(MSE)_{(A \cap B)}^{(A)} + W_{A2}(MSE)_{(A-B)}^{(B)} + W_{B1}(MSE)_{(A \cap B)}^{(B)} + W_{B2}(MSE)_{(B-A)}^{(B)}, \quad (9)$$

where the subscript denotes the gamut region where the MSE is computed on and the superscript denotes the color target where the reference Lab and scanned RGB values are obtained. The number of colorant and media combinations of this embodiment is not limited to two and this embodiment may be combined with either of the previous two embodiments to achieve more precise control of the weighting factor assignments.

The invention may be used to generate color conversion transforms for scanners in document copiers where multiple colorant and media combinations are to be scanned. However, the basic technique of assigning different weighting factors to different colorant and media combinations and areas of color spaces in the color transform creation process may be applied to any color image input devices where color metamerism is a concern.

Although several preferred embodiments of the invention have been disclosed, it should be appreciated that further modifications and variations may be made thereto without departing from the scope of the invention as defined in the appended claims.

We claim:

1. A method of transforming scanned RGB values into a colorimetric color space comprising:
   identifying multiple input media types to be scanned;
   assigning a weighting factor to each input media type;
   dividing input color space into segments;
   assigning a weighting factor to each input color space segment;
   applying regression and interpolation techniques to minimize color error; and
   generating a colorimetric output.

2. The method of claim 1 wherein said identifying multiple input media types includes identifying input media types taken from the group of media types including Kodak® photographic print media, graphic arts media, HP® ink jet prints on photo paper, outputs from Tektronix® laser printers, outputs from Canon® laser printers, and outputs from Xerox® laser printers.

3. The method of claim 1 which includes dividing the colorimetric color space into non-overlapping regions and assigning a weighting factor to each non-overlapping region.

4. The method of claim 3 wherein said dividing the colorimetric color space into non-overlapping regions includes dividing the colorimetric color space into a near-neutral grey region, a skin tone region, and another region.

5. The method of claim 1 wherein said dividing the input color space into segments includes dividing the input color space into a gamut volume representing a first set of media types and into a gamut volume representing a second set of media types.

6. The method of claim 5 wherein the first set of media types and the second set of media types divide the combined gamut into a region common to both sets of media types; the region that belongs to the first set but not the second set; and the region that belongs to the second set but not the first set; and wherein two weighting factors are assigned for the overlapping and non-overlapping regions of the first set and, wherein two weighting factors are assigned to the two regions of the second set.

7. A method of transforming scanned RGB values into a colorimetric color space comprising:
   identifying multiple input media types to be scanned, including identifying input media types taken from the group of media types including Kodak® photographic print media, graphic arts media, HP® ink jet prints on photo paper, outputs from Tektronix® laser printers, outputs from Canon® laser printers, and outputs from Xerox® laser printers;
   assigning a weighting factor to each input media type;
   dividing input color space into segments;
   assigning a weighting factor to each input color space segment;
   applying regression and interpolation techniques to minimize color error; and
   generating a colorimetric output.

8. The method of claim 7 which includes dividing the colorimetric color space into non-overlapping regions and assigning a weighting factor to each non-overlapping region, and wherein weighted regression and interpolation techniques are used to minimize weight MSE, and wherein the sum of the weighting factors is one.

9. The method of claim 8 wherein said dividing the colorimetric color space into non-overlapping regions includes dividing the colorimetric color space into a near-neutral grey region, a skin tone region, and another region.

10. The method of claim 7 wherein said dividing the input color space into segments includes dividing the input color space into a gamut volume representing a first set of media types and into a gamut volume representing a second set of media types.

11. The method of claim 10 wherein the first set of media types and the second set of media types divide the combined gamut into a region common to both sets of media types; the region that belongs to the first set but not the second set; and the region that belongs to the second set but not the first set; and wherein two weighting factors are assigned for the overlapping and non-overlapping regions of the first set and, wherein two weighting factors are assigned to the two regions of the second set.

* * * * *